(12) United States Patent
Droesbeke et al.

(10) Patent No.: US 9,564,704 B2
(45) Date of Patent: Feb. 7, 2017

(54) CONNECTOR ASSEMBLY

(71) Applicant: FCI Asia Pte. Ltd, Singapore (SG)

(72) Inventors: Gert Droesbeke, Besancon (FR);
Aymeric Soudy, Besancon (FR);
Gerard Marie Leon Pequignot,
Besancon (FR)

(73) Assignee: FCI Asia Pte. Ltd., Singapore (SG)

( * ) Notice: Subject to any disclaimer, the term of this patent is extended or adjusted under 35 U.S.C. 154(b) by 0 days.

(21) Appl. No.: 14/895,516

(22) PCT Filed: Jun. 7, 2013

(86) PCT No.: PCT/IB2013/001334
§ 371 (c)(1),
(2) Date: Dec. 3, 2015

(87) PCT Pub. No.: WO2014/195747
PCT Pub. Date: Dec. 11, 2014

(65) Prior Publication Data
US 2016/0111808 A1 Apr. 21, 2016

(51) Int. Cl.
*H01R 13/50* (2006.01)
*H01R 13/506* (2006.01)
(Continued)

(52) U.S. Cl.
CPC .......... *H01R 13/506* (2013.01); *G02B 6/3825* (2013.01); *G02B 6/3893* (2013.01); *H01R 12/7005* (2013.01); *H01R 13/6272* (2013.01); *H01R 13/639* (2013.01); *H01R 13/641* (2013.01); *H01R 13/4368* (2013.01); *H01R 2201/26* (2013.01)

(58) Field of Classification Search
CPC .............. H01R 13/506; H01R 12/7005; H01R 13/6272; H01R 13/639; H01R 13/641; H01R 13/4368; H01R 2201/26; G02B 6/3825; G02B 6/3893
See application file for complete search history.

(56) References Cited

U.S. PATENT DOCUMENTS 5,947,763 A * 9/1999 Alaksin .............. H01R 13/4362
439/352
7,326,074 B1 * 2/2008 Lim ...................... H01R 13/629
439/352

(Continued)

FOREIGN PATENT DOCUMENTS

EP 1 253 680 A1 10/2002

OTHER PUBLICATIONS

Office Action for European Application No. 13742266.3 dated Oct. 20, 2016.
EP 13742266.3, Oct. 20, 2016, Office Action.

*Primary Examiner* — Peter Radkowski
(74) *Attorney, Agent, or Firm* — Wolf, Greenfield & Sacks, P.C.

(57) ABSTRACT

A connector assembly including a first connector and a second connector connectable by a latch. The latch has a snap end for engaging a snap section and an opposite lock end. The latch includes a pivot section between the snap end and the lock end enabling a pivoting movement between a snap position and a release position. A lock is provided immobilizing the lock end of the latch to secure the latch in the snap position by blocking the pivoting movement.

27 Claims, 11 Drawing Sheets

Figure 1B:
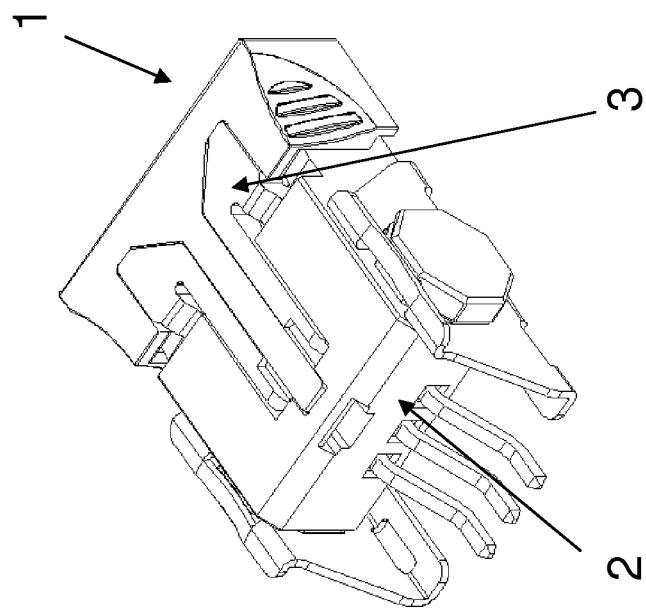

(51) Int. Cl.
*H01R 13/627* (2006.01)
*H01R 13/639* (2006.01)
*H01R 13/641* (2006.01)
*G02B 6/38* (2006.01)
*H01R 12/70* (2011.01)
*H01R 13/436* (2006.01)

(56) References Cited

U.S. PATENT DOCUMENTS

2004/0248453 A1   12/2004  McLauchlan et al.
2008/0139034 A1\*  6/2008  Dieterle ............. H01R 13/6272
                                                                                     439/352
2015/0147901 A1    5/2015  Wu et al.

\* cited by examiner

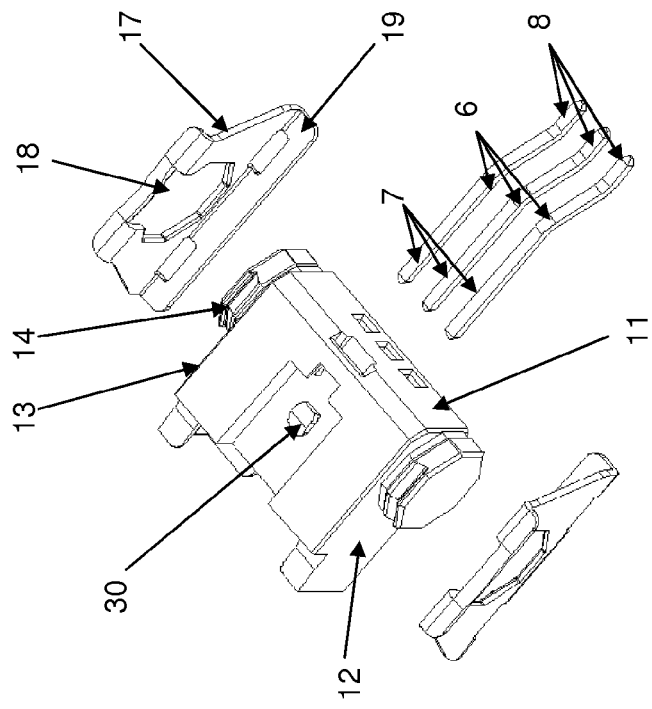
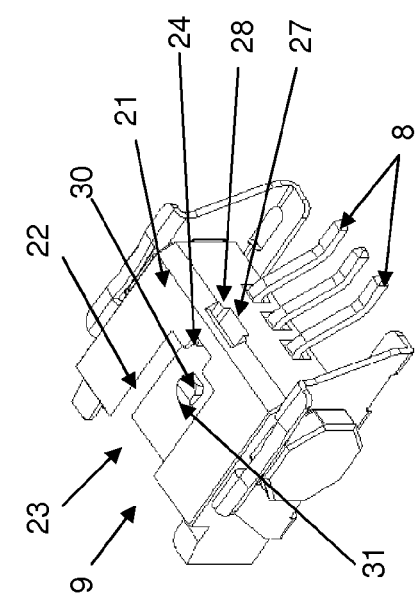
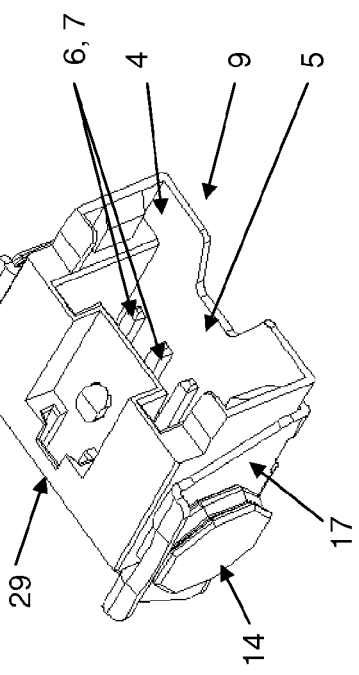

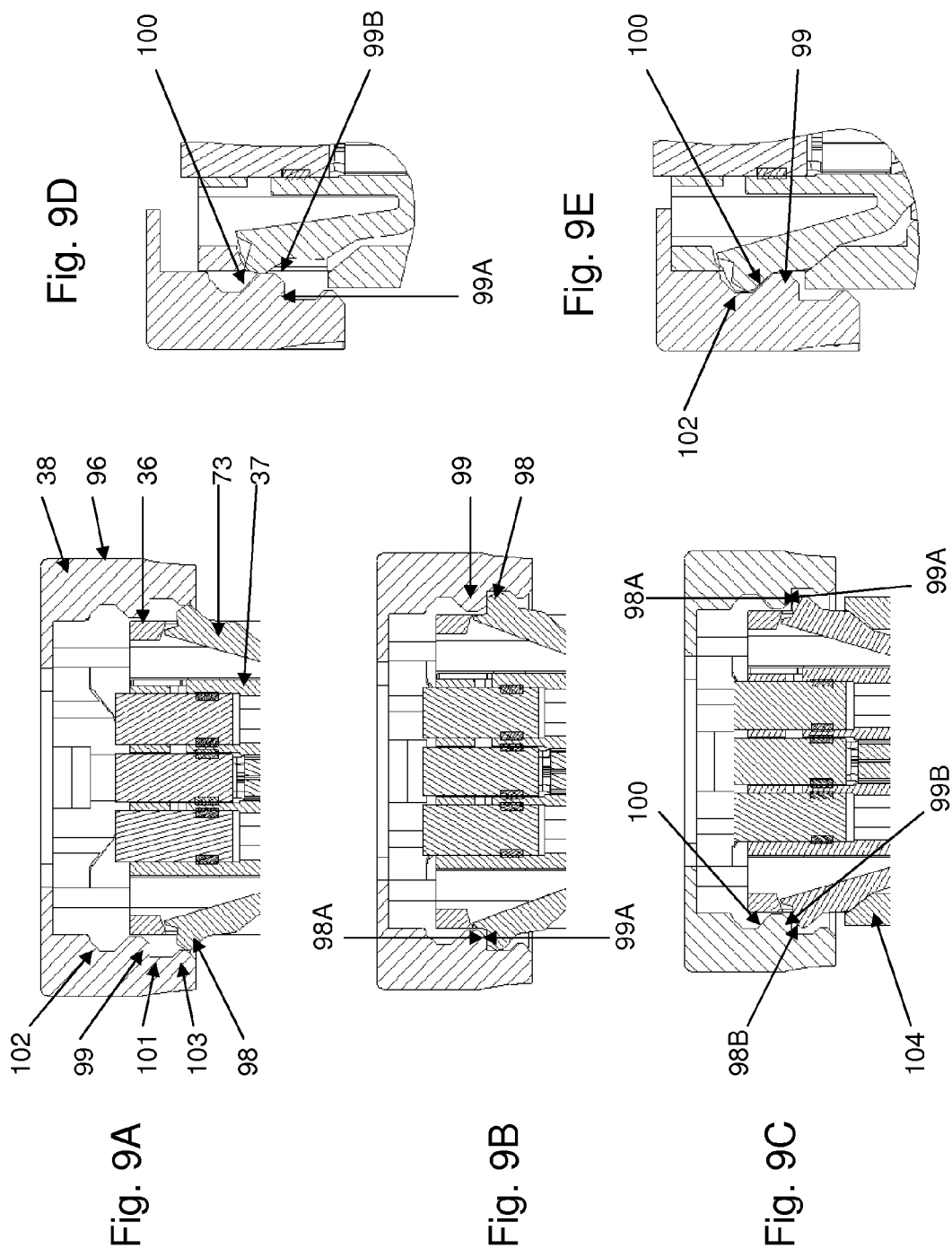

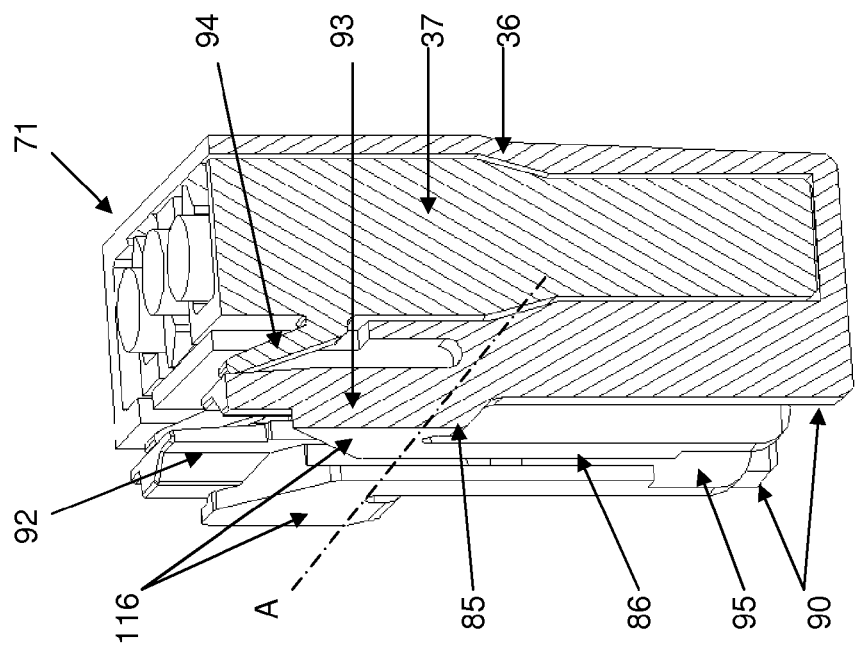
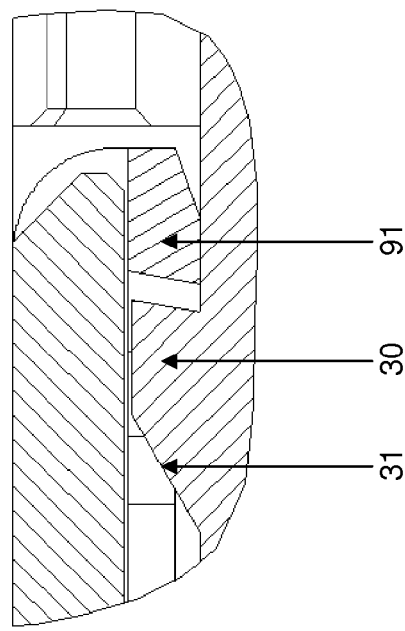

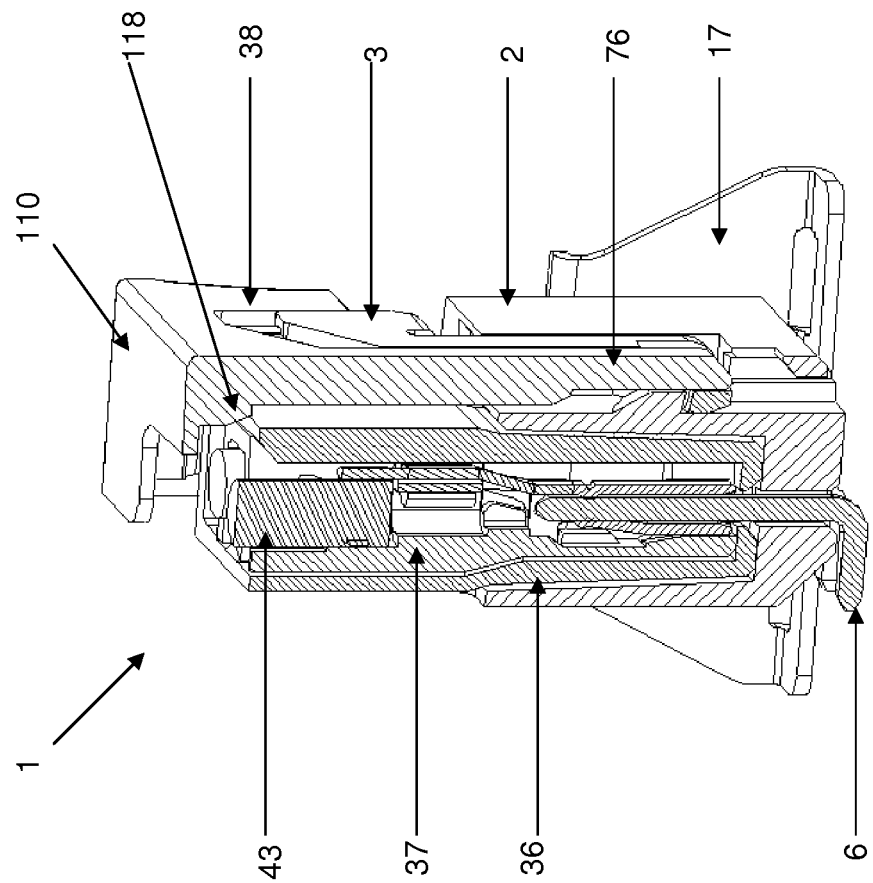

CONNECTOR ASSEMBLY

The invention relates to a connector assembly of two complementary connectors locked together by a latch mechanism. Such an assembly can for instance comprise a cable connector and an on-board pin header connector on a printed circuit board or a similar substrate. The connectors can for example be electrical connectors or optical connectors.

Particularly with connectors in the automotive field, connections between the connectors should be durable and reliable. Unintentional disengagement, e.g., by vibrational loads, should be prevented. To that end secondary locks are used, generally referred to as a connection position assurance (CPA) device. The use of such a CPA adds substantial volume to the connectors and contributes to space consumption. Accordingly, there is a need to provide a connector assembly with a reliably securable locking mechanism consuming less space.

To this end, a connector assembly is disclosed comprising a first connector and a second connector, the first connector comprising a latch having a snap end for engaging a snap section of the second connector and an opposite lock end. The snap section can for example be a notch, a cam, or a ridge. The latch is connected to a main body of the first connector and pivots about a pivot axis positioned between the snap end and the lock end. The latch is pivotable about this pivot axis between a snap position and a release position. A lock is provided for engaging the lock end of the latch. This blocks pivoting of the latch and secures the latch in the snap position. By engaging the lock end instead of the snap end itself, a compact lock can be used which does not need to extend along the complete length of the latch.

Optionally, the first connector comprises a connector housing with one or more sliding guides, the lock being a slider lock with complementary sliding guides for guiding movement of the slider lock to a securing position where it locks the lock end of the latch to secure locking by the latch. The sliding guides may for instance extend in an assembly direction coinciding with a connecting direction of the connector assembly. In a particular embodiment, the slider lock and the lock end may have side edges engaging to form a sliding guide. When the slider lock engages the sliding guides of the housing, it acts as an extension of the pivotable latch at the locking end and forms a lever enhancing the maneuverability of the latch. When the slider lock is fully slid into the locking position, it locks the latch.

The slider lock can for example have a cable passage and cap a cable entry side of the connector, so as to protect other parts of the connector.

In a specific embodiment, the slider lock may for example comprise a slider strip received in a recess of the latch. This recess may for example extend into a longitudinal direction of the latch from the lock end into the direction of the snap end, the recess crossing the pivot axis. The slider strip stiffens the latch, further reducing the risk of unintentional disengagement from the snap section of the second connector. The strip can be sunk within the latch to minimize space consumption.

The recess and the part of the slider lock received in the recess may have matching dovetail cross sections or any other suitable interlocking cross sections.

Optionally, the slider lock comprises a top edge with two recesses flanking the slider strip, wherein the lock end of the latch is provided with flaps fitting in the respective recesses. The pivot axis may substantially coincide with an edge of the top edge section of the slider lock. The flaps can be telescopically received in the recesses by means of sliding guides. These measures help to prevent the latch from pivoting into its release position disengaging the snap section of the second connector.

The risk of unintentional disengagement of the latch can be further reduced by providing the slider lock with a bulge at the lock end of the latch, the bulge engaging a contact surface of the first connector when the slider lock is in the securing position.

To minimize space consumption, the slider lock and the latch can have outer surfaces which are flush with each other. Also the latch can be received in a recess in a surface of the second connector. In that case, the slider lock and the latch can have outer surfaces which are flush with an outer surface of the second connector. If in the final assembly the flush outer surface is parallel to a connected printed circuit board consumption of space above the assembly is minimized. If the flush outer surface is under an angle with, e.g., perpendicular to a connected printed circuit board, the covered part of the circuit board area is minimized.

In a specific embodiment, the slider lock can comprise a top front face at the lock end of the latch, and two ears at both ends of the top front face extending over side faces of the first connector. The slider lock can further comprise a top flange at a cable entry side of the first connector, the top flange being connected to the top front face and to the ears and having a recess defining a cable passage. The ears, the top flange and the top front face will typically be substantially orthogonal relative to each other. Such a slider lock firmly caps the first connector blocking pivoting of the latch.

Optionally, the ears have inner surfaces with two or more indentations separated by a stop, while the first connector is provided with resilient arms snapped into the respective first indentations when the slider lock is in a first position, and into the respective second indentations when the slider lock is in the securing position. This forms an additional snap-fit connection. If audible, the click informs a user that the slider lock is in the securing position, securing the latch in its locking position.

In a further embodiment, the slider lock has a terminal end protruding beyond the snap end of the latch when the slider lock is in the securing position. The terminal end of the slider lock can be received in a matching recess in the second connector. This holds down the snap end of the latch.

To prevent removal of the lock when it is not or not yet in its locking position, the connector assembly, e.g., the first connector, may be provided with retention means, such as a non-release snap fit holding the lock in a first position before it is moved into its locking position.

The snap section may for example comprises a cam chamfered at both sides in a connecting/disconnecting direction to prevent a stable intermediate rest position. If the force during assembly is too small, the latch may slide back, preventing unintentional coupling. If the force exerted during assembly is sufficiently large to pass the cam, the latch will slide in place over the chamfered surface. In this respect, the connecting/disconnecting direction is the direction of relative movement of the lock and the connector housing during assembly or disassembly.

The assembly, e.g., the first connector, can for example be provided with resilient spring elements, such as resilient lips, engaging the lock end of the latch to bias the latch to its snap position. The resilient lips can for example be comprised at one side of a clip holding terminal contacts, the latch forming part of an outer housing encasing the clip. The outer housing may comprise openings receiving the lips to allow the lips to engage the lock end of the latch. Besides biasing the latch, the lips also form a polarization feature, allowing only one orientation of the clip during insertion into the outer housing.

In the disclosed connector assembly, the first connector may for example be a cable connector, and the second connector may for example be an on-board pin header connector. Alternatively, both connectors can be cable connectors.

In a specific embodiment, the assembly comprises a cable connector and an on board connector, such as an on-board pin header connector, wherein the cable connector comprises the latch and the slider lock. Alternatively, the pin header connector may comprise the latch and/or the slider lock.

In a further aspect a connector is disclosed configured as a first connector or as a second connector in a connector assembly as disclosed above. Furthermore, a housing is disclosed for a connector configured as a first connector or as a second connector in an assembly as disclosed above.

The disclosed connectors are particularly useful for use in the automotive field, e.g., for connecting LED lamps to a PCB controlling and/or powering the LED lamps.

The invention will be further explained under reference to the accompanying drawings.

Figure 1A:
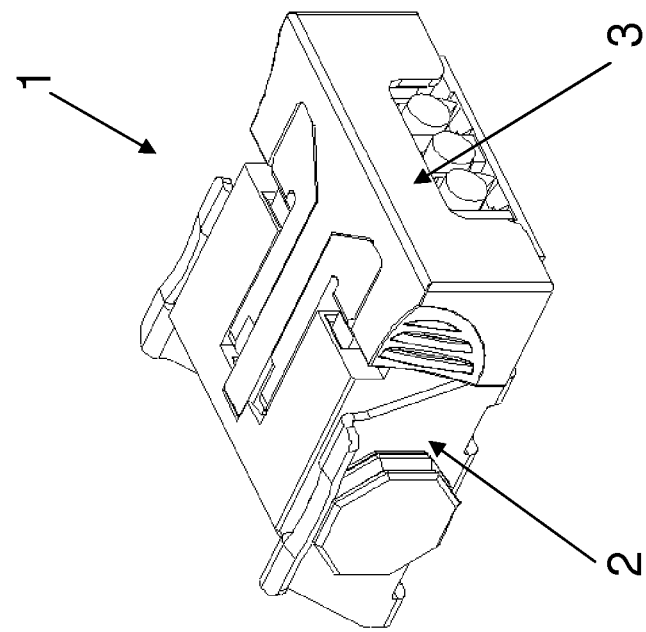
Figure 3C:
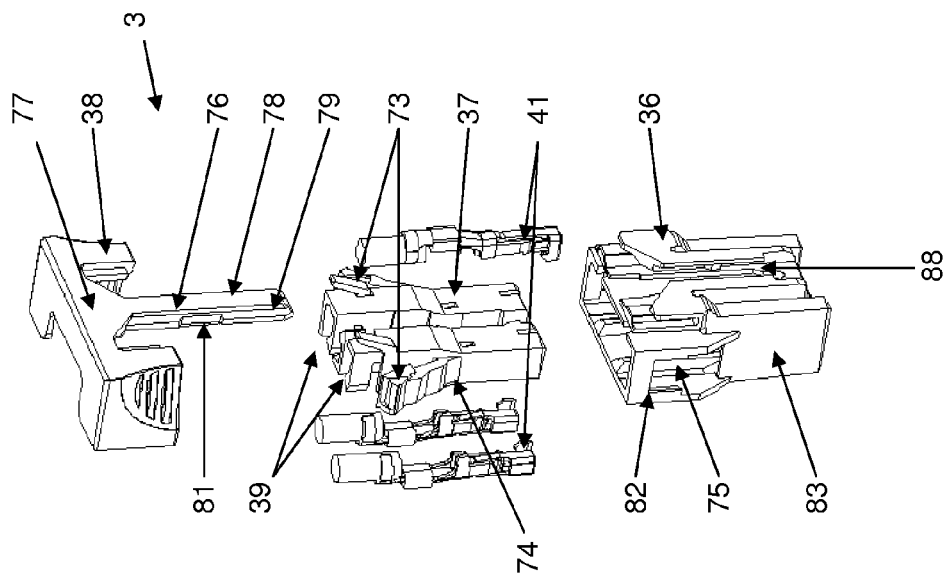
Figure 3A:
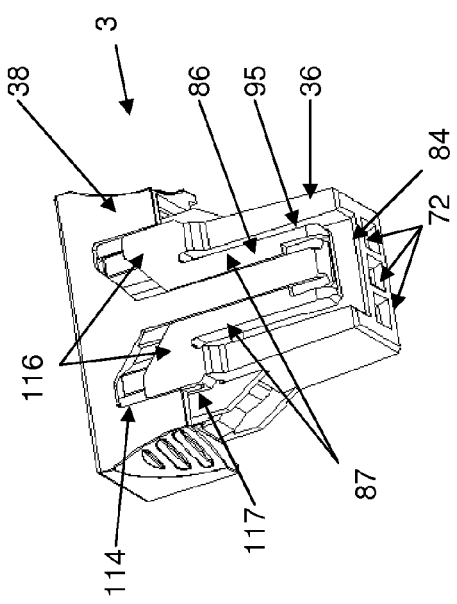
Figure 3B:
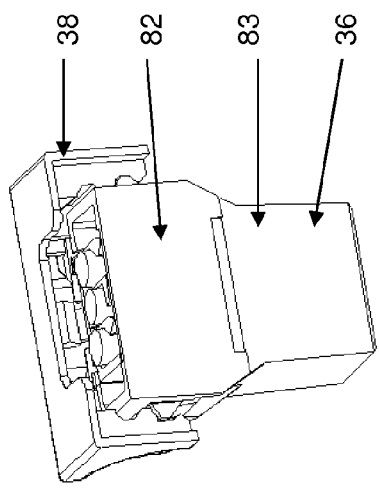
Figure 4:
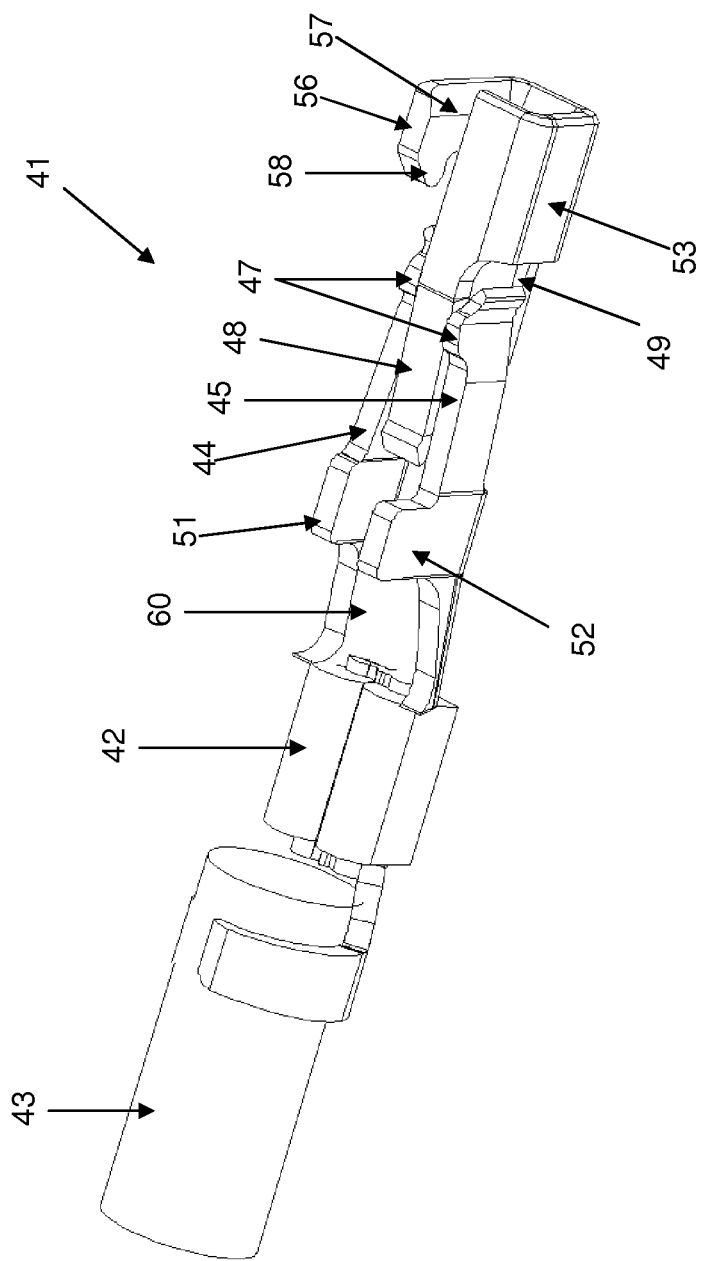
Figure 6:
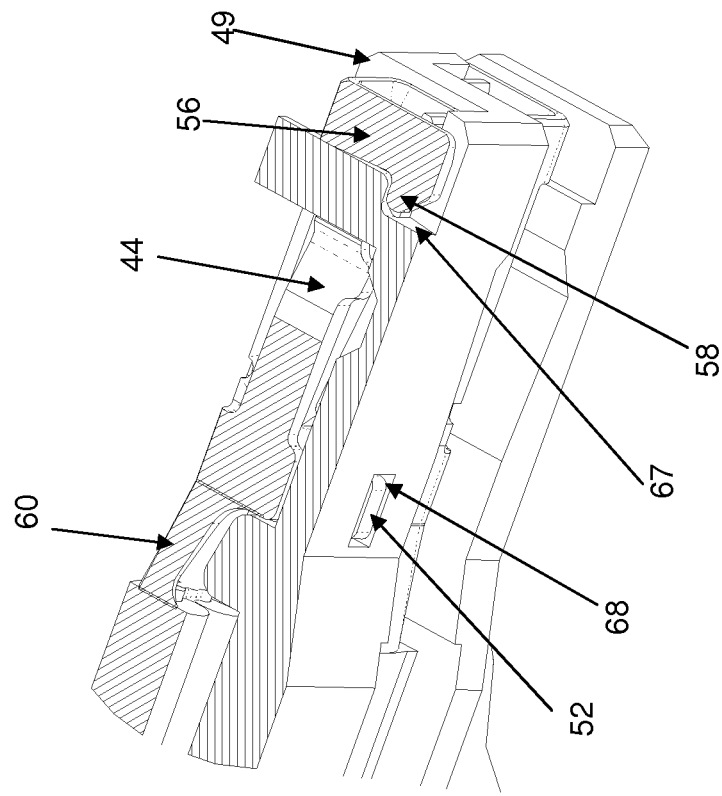
Figure 5:
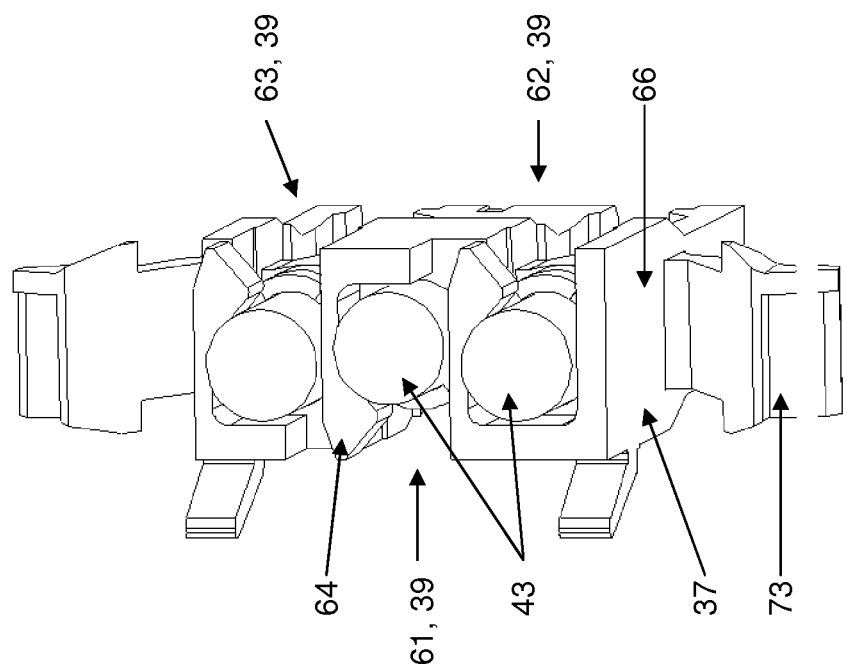
Figure 8:
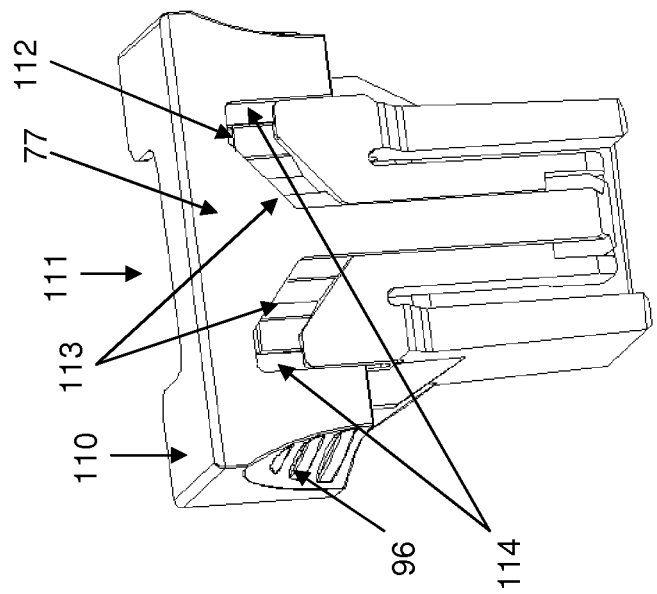
Figure 7:
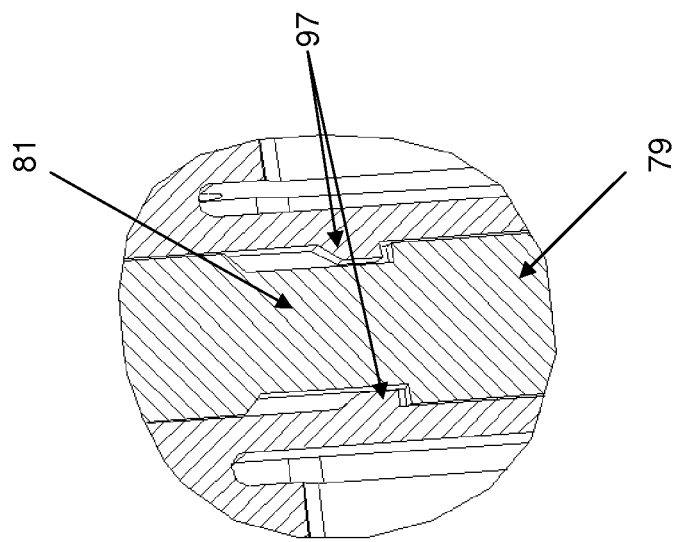
Figure 10B:
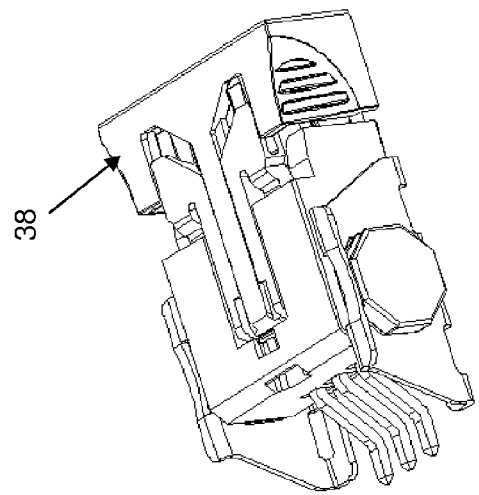
Figure 10A:
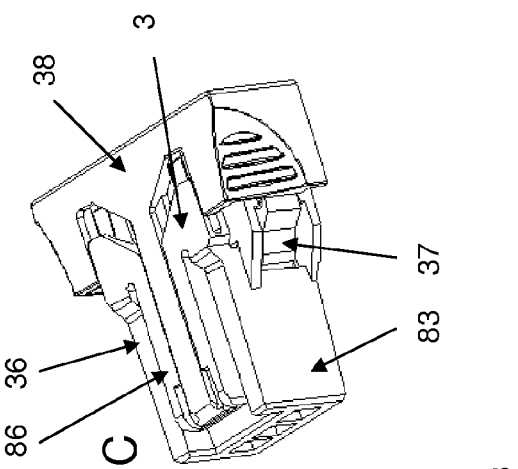
Figure 10C:
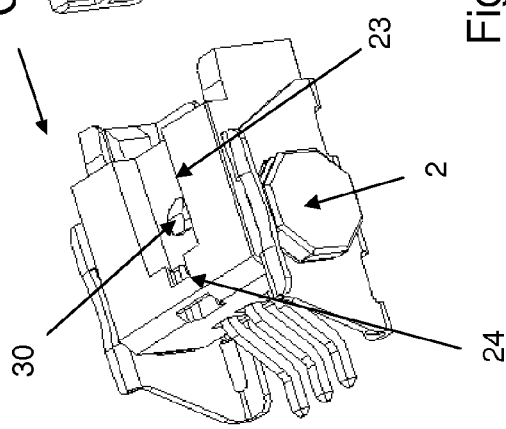
Figure 15:
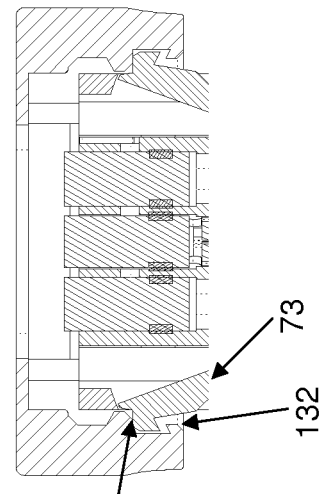
Figure 14:
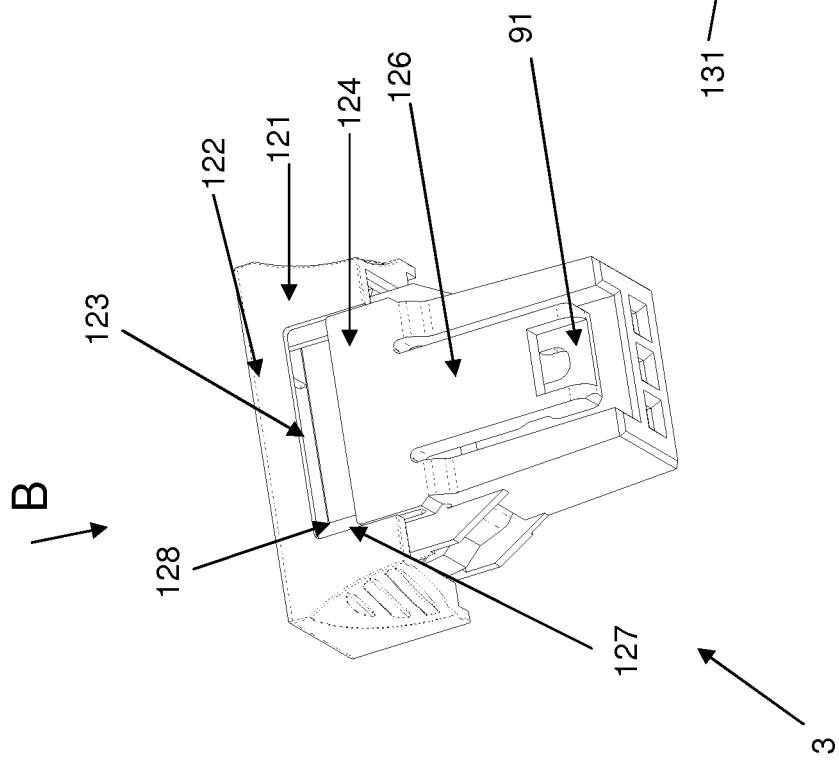

FIG. 1A: shows an exemplary embodiment of an assembly with a cable connector and a complementary pin header connector;

FIG. 1B: shows the assembly of FIG. 1A from a different view point;

FIG. 2A: shows the pin header connector of FIG. 1A;

FIG. 2B: shows the connector of FIG. 2A from a different view point;

FIG. 2C: shows the connector of FIG. 2A in exploded view;

FIG. 3A: shows the cable connector of FIG. 1A;

FIG. 3B: shows the connector of FIG. 3A from a different view point;

FIG. 3C: shows the connector of FIG. 3A in exploded view;

FIG. 4: shows a terminal contact of the cable connector of FIG. 3A;

FIG. 5: shows a detail of the cable connector of FIG. 3A;

FIG. 6: shows in detail two terminal contacts positioned in the cable connector of FIG. 3A;

FIG. 7: shows in cross section a detail of the cable connector of FIG. 3A;

FIG. 8: shows a housing with a slider lock of the cable connector of FIG. 3A;

FIGS. 9A-E: shows in cross section consecutive assembly steps of the cable connector of FIG. 2A;

FIGS. 10A-C: shows consecutive assembly steps of the assembly of FIG. 1A;

FIG. 11: shows in cross section a detail of the cable connector of FIG. 3A;

FIG. 12: shows in detail partially in cross section the inner side of the cable connector of FIG. 3A;

FIG. 13: shows the connector assembly of FIG. 1 in cross section;

FIG. 14: shows an alternative embodiment of a cable connector;

FIG. 15: shows a partial cross section of the connector of FIG. 14.

FIGS. 1A and 1B show two perspective views of an assembly 1 of an on-board pin header connector 2 on a printed circuit board (not shown) and a complementary cable connector 3. The connectors 2, 3 as shown are locked and secured in the locked position, as will be explained in detail hereinafter.

The pin header connector 2 is shown separately in FIGS. 2A-C and comprises a hollow housing 4 and a plurality of parallel contact pins 6. Each contact pin 6 has one end 7 extending in the cavity 5 of the housing (FIG. 2B), while its other end 8 extends outside the housing 4 (FIG. 2A) for connection to a printed circuit board (not shown).

The housing has an open front side 9 (see FIG. 2B) providing access to the cavity 5, a closed back side 11 (see FIG. 2A) and two side faces 12, 13 provided with an octagonal projection 14. A hold down member 17 with an octagonal opening 18 fits over the octagonal projection 14 and comprises a lower flange 19 for connection to the printed circuit board. Due to the octagonal fit, the two hold down members 17 can fixate the pin header connector 2 in a horizontal position (see FIGS. 2A and 2B), a 45 degrees position or a vertical position (see FIG. 13).

The top side 21 of the housing 4 of the pin header connector 2 is provided with a recess 22 extending parallel to the longitudinal direction of the pins 6. A first section 23 of the recess 22 extends from the open side 9 of the housing 4 and has a rectangular cross sectional shape. A second section 24 of the recess 22 extends between the first section 23 and the closed back side 11 of the housing 4. At the second section 24 the width of the recess 22 is less than at the first section 23. Two oppositely directed flanges 26 narrow the open side of the recess 22 at the second section 24. At the second section 24 the recess 22 has a narrower lower part 27 and a wider upper part 28. At the end face 11, the recess 22 is bridged by a strip 29.

Centred in the first section 23 of the recess 22 is a snap section 30 formed by a projection with a height well below the depth of the recess 22 and with a front side 31 slanting down in the direction of the open side 9 of the housing 4. In the shown embodiment, the top side of the projection 30 is flat. In an alternative embodiment the top face may slant down in the direction of the strip 29, as will be explained here after.

FIGS. 3A-C show the cable connector 3, which comprises a housing 36, an inner clip 37 and a slider lock 38. FIG. 3A shows the connector 3 before the slider lock 38 is pushed into its securing position.

As shown in FIG. 3C, the clip 37 comprises parallel slots 39 for receiving terminal contacts 41 extending between a cable entry side of the clip 37 and a pin receiving side of the clip 37. A separate terminal contact 41 is shown in more detail in FIG. 4. Each terminal contact 41 has one end with a cable crimp connection 42 crimped to a cable end 43. The terminal contacts 41 comprise two parallel resilient contact beams 44, 45 with tips 47 forced apart by an oppositely directed third resilient contact beam 48. The third beam 48 preloads the two parallel contact beams 44, 45 resulting in a firm contact pressure with an inserted contact pin 6 of a complementary pin header connector 2.

A base strip 49 facing the third contact beam 48 is connected to the two parallel contact beams 44, 45 by two oppositely arranged flanges 51, 52 at either side of the base strip 49. The end of the base strip 49 is connected to the third contact beam 48 by a third flange 53. The flanges 51, 52, 53 and the contact beams 44, 45 are substantially under right angles with the base strip 49. The third contact beam 48 is parallel to the base strip 49.

A pin receiving opening 54 of the terminal contact 41 is confined by:

the third contact beam 48;

the third flange 53 bridging the third contact beam 48 and the base strip 49;

the base strip 49; and a fourth flange 56 opposite the third flange 53.

A gap 57 remains between the fourth flange 56 and the third contact beam 48. The gap 57 provides additional flexibility to the base strip 49.

The fourth flange 56 protrudes above an upper face of the third contact beam 48 and is provided with a hook 58 pointing in the direction of the cable crimp connection 42.

The flange 52 that is in line with the third flange 53 protrudes above an upper face of the third contact beam 48 to form a key flange or flag.

The contact beam 45 in line with the third flange 53 is somewhat shorter than the contact beam 44 in line with the hooked fourth flange. As a result the three contact beams 44, 45, 48 provide staggered contact points to contact a pin 6 of the pin header connector 2.

The terminal contacts 41 have a sloping middle section 60 connecting the side of the pin receiving opening 54 with the side of the crimp connection 42 (see also FIG. 6). The sloping section 60 offsets the pin receiving opening 54 from the crimp connection 42 to prevent direct contact between an inserted contact pin of a mating header connector with the crimp connection 42.

The terminal contacts 41 are clipped into the longitudinal slots 39 of the clip 37, as shown in FIG. 5. The slots 39 are profiled to match the shape of the terminal contacts 41 to receive these in only one single possible position. The terminal contacts 41 fit in the slots 39 with a clearance fit to keep the contacts 41 floating within the assembled cable connector. This floating helps to reduce vibration sensitivity.

In the exemplary embodiment shown in the drawings, see, e.g., FIG. 5, the slots 39 of the clip 37 include a middle slot 61 accessible from one side of the clip 37, and two slots 62, 63 flanking the middle slot 61, which are accessible from an opposite side of the clip 37. At the cable entry side the slots 39 are provided with flexible snap hooks 64 snapping around the cable ends 43. A first slot 62 is formed between a snap hook 64 and a side wall 66 of the clip 37. The middle slot 61 and the third slot 63 are formed between two adjacent snap hooks 64 pointing in opposite directions.

During assembly the first terminal contact 41 is clipped into the first slot 62. Subsequently, a second terminal contact 41 is clipped into the middle slot 61, thereby locking the first slot 62 with the first terminal contact 41. Similarly, the second terminal contact 41 is locked by clipping the third terminal contact 41 into the third slot 63.

The pin receiving side of the clip 37 is provided with a first retention slot 67 receiving the hook 58 of the respective terminal contact 41 (see FIG. 6). The gap 57 provides additional flexibility to the base strip 49 so the hook 58 can snap easier into the retention slot 67 during assembly, while the contact beams 44, 45 remain pre-loaded.

Similarly, also the projecting key flange 52 in line with the third flange 53 is received in a matching second retention slot 68 within the slot 39 receiving the terminal contact 39. The retention slots 67, 68 can be dimensioned in such a way that a tensile force exerted via the cable end will first stress the key flange 52 in the second retention slot 68. The hooked third flange 56 in the first retention slot 67 mainly serves as a back-up lock. However, if the tensile force slightly deforms the retention slot 68 holding key flange 52, it will also pull the hooked third flange 56 in the first retention slot 67. This provides an additional reaction force, by which the total reaction force is increased. This helps to reduce stresses at the area of the contact beams 44, 45.

After the terminal contacts 41 are clipped into the respective slots 39, the clip 37 can be pushed into the housing 36, as shown in FIG. 12. The housing 36 is formed as a symmetrical sleeve with a rectangular outline in cross section having an open cable entry side 71 and a pin entry side with a row of openings 72 (FIG. 3A). After assembly each opening 72 exposes a pin receiving opening 54 of an associated terminal contact 41.

The side faces of the clip 37 are provided with resilient flaps 73 (FIG. 3C). The side edge 74 of the flap 73 directed to the pin entry side 72 is connected to the rest of the clip 37. Side faces of the housing 36 are provided with openings 75 receiving the resilient flaps 73 when the clip 37 is slid into the housing 36.

The slider lock 38 has a T-shaped body with a slider strip 76 centrally extending from a front face edge 77 near the cable entry side 71 in the direction of the pin receiving side 72. The slider strip 76 has a narrow front part 78 symmetrically topping a wider backbone 79. The wider backbone 79 shows a narrowed section 81 about halfway its length (see FIGS. 3C and 7). The front face edge 77 is flanged with a top flange 110 partly covering the cable entry side of the housing 36 and having a recess 111 defining a passage opening for the connected cables 43. The outer ends of the front face edge 77 and the outer ends of the top flange 110 are connected by downwardly extending ears 96. The ears 96 have profiled surfaces to provide a better grip. The ears 96, the top flange 110 and the front face edge 77 are orthogonal relative to each other. The front face edge 77 has two symmetrically arranged recesses 112 at both sides of the slider strip 76. Both recesses 112 have a bevel top side 113, thus providing a broadening section of the slider strip 76 at the front face edge 77. At the side opposite to the slider strip 76 both recesses 112 are provided with a slider rib 114 in the same plane as the backbone 79 of the slider strip 76.

The housing 36 has a wider upper part 82 at the cable entry side and a narrower lower part 83 at the pin receiving side (see FIG. 3B). A front side of the housing 36 comprises a recess 84 over the length of the narrower part 83 (see FIG. 3A). A U-shaped latch 86 extends above the recess 84. Two legs 87 of the U-shaped latch 86 confine a slider strip receiving recess 95 with a stepped cross section, which is narrower at the latch surface than below the latch surface to keep the slider strip 76 within the recess 95. Alternatively, the slider strip receiving recess 95 may have a dovetail cross section instead of a stepped cross section. The slider strip receiving recess 95 extends along the length of the latch 86 from a lock end 105, where the lock strip 76 can be slid into the slider strip receiving recess 95, to the snap end 91. The edges of the legs 87 confining the slider strip receiving recess 95 are provided with facing open sides or slits 88 to form the stepped cross section for tightly receiving the backbone 79 of the slider strip 76 in a sliding manner (see FIG. 3C). The top ends of the legs 87 are connected to flaps 116 shaped to fit within the recesses 112 in the front face edge 77 of the slider lock 38. The slider ribs 114 of the slider lock front face edge 77 are received in corresponding slits 117 at a side of the flap opposite to the side that lays against the slide strip 76. The slider ribs 114 in the slits 117 and the backbone 79 received in the slits 88 join the slider lock 38 and the outer housing 36 in such a way the slider lock 38 acts as an extended lever of the of the U-shaped latch 86.

The backbone 79 and the slider ribs 114 form sliding guides with the recess 95 and the slits 117 respectively. Via these sliding guides the slider lock 38 can be slid onto the connector housing 36 in a direction B coinciding with a connecting direction C of the connector assembly 1, and with the longitudinal direction of the slider strip 76.

In FIG. 12 the clip 37 and the housing 36 are shown without the slider lock 38 and with one side wall of the housing 36 broken away. A bridge 85 connects the flaps 116 to the side walls 90 of the recess 84 and forms a pivot axis A allowing resilient pivoting by the latch 86. The pivot axis A substantially coincides with the lower edge of the front section of the slider lock 38 and is perpendicularly crossed by the slider strip receiving recess 95. The legs 87 of the U-shaped latch 86 have a lower wall 92 extending to the cable entry edge of the housing 36. This lower wall 92 and the flaps 116 are connected to the bridge 85 by a side wall 93. The lower walls 92, the side walls 93 and the bridge 85 form a first sliding guide for guiding the slider lock 38 into the desired position. A second sliding guide is formed by the slider ribs 114 received in the slits 117. The clip 37 is provided with resilient lips 94 pushing against the top ends of the lower walls 92 of the U-shaped latch 86 to bias the U-shaped latch 86 into a downwardly tilted securing position. The lips 94 are received in corresponding openings in the housing 36 at the latch side of the connector. As a result, the clip 37 with the lips 94 can be inserted into the housing 36 in only one single orientation, so misplacement is effectively prevented.

At the opposite end of the U-shaped latch 86 the lower walls 92 of the two legs 87 are connected by a bridge 91, shown in detail in FIG. 11. The bridge 91 forms a snap end of the latch 86 and is configured to snap over the projection 30 in the recess on top of the pin header connector housing 2 (see FIG. 2A), as will be explained hereinafter. The resilient lips 94 of the clip 37 bias the bridge 91 to snap over the projection 30.

During assembly the base part 79 of the slider strip 76 is received in the oppositely arranged open slits 88 in the legs 87 of the U-shaped latch 86. This is shown in FIG. 7, which shows the slider strip 76 inside the slits 88 with the top wall bordering the slits 88 being broken away. About halfway their length the slits 88 are locally narrowed by two oppositely arranged cams 97, dimensioned to slide along the narrowed section 81 at the outer edge of the slider strip 76. When the slider strip 76 of the slider lock 38 is introduced into the slits 88, it will first encounter the two oppositely arranged cams 97. The U-shaped latch 86 is dimensioned in such a way that its walls bulge elastically to allow further passage of the slider strip 76. The cams 97 in the slits 88 snap into the narrowed section 81 of the slider strip 76, allowing the elastically bulged U-shaped latch 86 to buckle back into its original shape. In this position, the ears 96 of the slider lock 38 partly cover the top ends of the side faces of the housing 36 and the openings 75 with the resilient flaps 73 of the clip 37. This way, the risk of unintentional release of the clip 37 is effectively reduced. In this position, shown in perspective view in FIG. 8, the outer end of the slider strip 76 is in line with the outer end of the U-shaped latch 86.

As shown in FIG. 9A-E, the flaps 73 of the clip 37 have top ends with profiled cams 98. Both ears 96 of the slider lock 38 have a set of two indentations separated by a stop 99: a lower indentation 101 and an upper indentation 102. The lower indentation 101 is bordered by a chamfered edge 103. When the slider lock 38 is pushed onto the housing 36 the chamfered edges 103 will push the flaps 73 of the clip 37 inwardly until the cams 98 of the flaps 73 snap into the lower indentation 101 and encounter the stop 99, as shown in FIG. 9B.

The assembly of slider lock 38, clip 37 and housing 36 can then be coupled to the pin header connector 2, as shown in FIGS. 10A-C in consecutive steps. To this end the narrower section 83 of the housing 36 is inserted into the receiving cavity 5 of the pin header connector 2, while the U-shaped latch 86 holding the slider lock 38 is slid into the first section 23 of the recess 22 on the top face of the header connector housing 4. The U-shaped latch 86 snaps over the projection 30 in the recess 22 of the pin header connector 2. If the top face of the projection 30 slants down in the direction of the strip 29, as disclosed above, the projection 30 will pull the U-shaped latch 86 to snap into its final position.

The slider lock 38 effectively extends the housing 36 (see FIG. 10B) and accordingly forms an additional lever for manoeuvring the U-shaped latch 86. When the projection 30 snaps behind the bridge 91 of the U-shaped latch 86 a first audible click provides user feedback informing the user that the two connectors 2, 3 are connected and locked. In this position (see FIG. 10B) the mating face of the cable connector encounters the bottom of the receiving cavity 5 of the header housing 4. The slider lock 38 can still be pushed further into the second section 24 of the recess 22 on top of the pin header connector housing 4.

FIG. 9B shows in cross section the slider lock 38 capping the housing 36 in the same stage of assembly as shown in FIG. 10A. At the side of the first indentation 101 the stops 99 have a stop face 99A substantially perpendicular to the assembly direction. The cams 98 have a corresponding stop face 98A, preventing passage of the cams 98 beyond the stop 99.

As shown in FIG. 9C, the housing of the pin header connector 2 comprises two inwardly chamfered flanges 104 flanking the receiving opening (see also FIG. 2B). These chamfered flanges 104 engage the flaps 73 of the clip 37 and gradually push the flaps 73 inwardly, until the stop face 98A of the cam 98 does not abut the stop face 99A of the stop 99 anymore. A chamfered edge 98B of the cam 98 now starts abutting a correspondingly chamfered edge 99B of the stop 99, allowing further inward pushing of the flap 73 so the flaps 73 can pass the stop 99. The force needed to push the chamfered edge 98B over the chamfered edge 99B is larger than the sum of the remaining mating forces, which includes friction forces between the pin contacts and the terminal contacts and the force required to drive the latch 86 over the projection 30. This way the slider strip 76 cannot be pushed into the recess 24 before the cable connector 3 is fully mated with the pin header connector 2.

The stop 99 has a sloping face 100. After passing the stop 99 the cam 98 of the flaps 73 snaps into the second indentation 102 (see FIG. 9E), resulting in a second audible click informing the user that the locking of the two connectors 2, 3 is now secured. The sloping face 100 of the stop 99 pulls the flaps 73 and the cable connector 3 upwardly against the top flange 110 of the slider lock 38. As a result, any attempt to unlock the cable connector by pushing on the top flange 110 will fail since it would drive the flaps 73 and the cable connector 3 further into the slider lock 38.

When the cam 98 of the flap 73 is in the second indentation 102 of the slider lock 38, the outer end of the slider strip 76 extends past the outer end of the U-shaped latch 86 into the narrower second section 24 of the recess 22 of the pin header connector 2 (see FIG. 10C). The flaps 73 of the clip 37 are now completely overlapped by the ears 96 of the slider lock 38 and the clip 37 is fully shielded and hidden from view.

In the assembled condition, the top faces of the slider lock 38 the U-shaped latch 86 and the pin header connector housing 4 are all within the same plane. With all latching parts 76, 86 being sunk in corresponding recesses less space is consumed above the circuit board and a very compact build-up is achieved.

As particularly shown in FIG. 11, the tip 106 of the slider strip 76 is chamfered. The flanges 26 narrowing the open side of the second section 24 of the recess 22 on the pin header connector housing 4 have contact faces 107 which are chamfered at a corresponding angle. In the final position the chamfered tip 106 will engage the chamfered contact faces 107 and will be pushed down even if the slider lock is slightly tilted during assembly, as shown in FIG. 11.

FIG. 13 shows in cross section the connector assembly 1 of the cable connector 3 with the pin header connector 2. The assembly 1 is similar as the assembly in FIG. 1, with the difference that the pin header connector 2 is held by the hold down members 17 in a vertical position. The slider strip 76 is connected to the top flange 110 with a thickened root section 118 engaging the outer wall of the housing 36 of the cable connector 3 when the slider lock is pushed into its securing position. This further fixates the slider lock 38 relative to the housing 36 and prevents any manoeuvrability of the slider strip 76 by pushing the cable entry side of the slider lock 38.

FIG. 14 shows an alternative, more simplified embodiment of the cable connector 3. This embodiment is similar to the embodiment of FIG. 3A-C, the main difference being the absence of the slider strip 76 and the slider strip receiving recess 95. The connector comprises a slider lock 121 having a front face 122 with a rectangular recess 123 receiving a rectangular lock end 124 of the latch 126. At both opposite sides of the rectangular recess 123 the front face 122 of the slider lock 121 has edges 127 parallel to the assembling direction, i.e., the direction in which the slider lock 121 is slid onto the connector 3, indicated by arrow B in FIG. 14. The assembling direction coincides with the connecting direction C indicated in FIG. 10A. The edges 127 are provided with ribs 128 engaging corresponding slits 129 in opposite sides of the lock end 124 of the slider lock 121 to form a sliding guide. When the lock end 124 is fully inserted into the rectangular recess 123 of the slider lock front face 122, the latch 126 is secured in the latching position and cannot be pivoted anymore to release the snap-fit of the snap end 91 snapping behind the snap section 30 of the second connector.

FIG. 15 shows a cross section of the top end of the connector after it is capped by the slider lock 121. In this embodiment, the flaps 73 are provided with a non-releasing cam or ridge 131 hooking behind a corresponding undercut 132 at the inner side of the slider lock 121. This helps to prevent release of the slider lock 121.

The invention claimed is:

1. A connector assembly comprising a first connector and a second connector connectable by a latch having a snap end for engaging a snap section and an opposite lock end, the latch comprising a pivot section between the snap end and the lock end enabling a pivoting movement between a snap position and a release position, wherein a slider lock is provided immobilizing the lock end of the latch to secure the latch in the snap position by blocking the pivoting movement, wherein the slider lock comprises a slider strip configured to be received through a portion of the first connector, and wherein an end of the slider lock is configured to extend into a portion of the second connector.

2. A connector assembly according to claim 1, wherein the first connector comprises a connector housing with one or more sliding guides, the slider lock comprising complementary sliding guides, the sliding guides extending in an assembly direction coinciding with a connecting direction of the connector assembly.

3. A connector assembly according to claim 2, wherein the slider strip is configured to be received in a slider strip receiving recess of the latch.

4. A connector assembly according to claim 3, wherein the slider strip receiving recess in the latch extends into a longitudinal direction of the latch from the lock end into the direction of the snap end, the slider strip receiving recess crossing the pivot axis.

5. A connector assembly according to claim 3, wherein the slider strip and the slider strip receiving recess have matching cross sections, e.g., stepped or dovetail cross sections.

6. A connector assembly according to claim 5 wherein the slider strip receiving recess comprises a stop allowing one-way passage of the strip.

7. A connector assembly according to claim 2, wherein the slider lock and the lock end have side edges engaging to form a sliding guide.

8. A connector according to claim 7, wherein the slider lock comprises a top front face with two recesses flanking the slider strip, wherein the lock end of the latch is provided with flaps received in the recesses by means of sliding guides.

9. A connector assembly according to claim 7, wherein the pivot axis substantially coincides with an edge of the top front face of the slider lock.

10. A connector assembly according to claim 2, wherein the slider lock is provided with a thickened root section at the lock end of the latch, the bulge engaging a contact surface of the first connector when the slider lock is in the securing position.

11. A connector assembly according to claim 2, wherein the slider lock and the latch have outer surfaces which are flush with each other.

12. A connector assembly according to claim 2, wherein the latch is received in a recess on a surface of the second connector.

13. A connector assembly according to claim 12, wherein the slider lock and the latch have outer surfaces which are flush with an outer surface of the second connector.

14. A connector assembly according to claim 2, wherein the slider lock comprises a top front face at the lock end of the latch, and two ears at both ends of the top front face extending over side faces of the first connector.

15. A connector according to claim 14, wherein the slider lock comprises a top flange at a cable entry side of the first connector, the top flange being connected to the front face edge and to the ears and having a recess defining a cable passage.

16. A connector assembly according to claim 15, wherein the ears, the top flange and the top front face are substantially orthogonal relative to each other.

17. A connector assembly according to claim 16, wherein the ears have inner surfaces with two indentations separated by a stop, while the first connector is provided with resilient arms snapped into the respective first indentations when the slider lock is in a first position, and into the respective second indentations when the slider lock is in the securing position.

18. A connector assembly according to claim 17 wherein the stop has a chamfered stop face for engaging a correspondingly chamfered edge of the resilient arm to provide a force exceeding a force required to connect the first and second connectors.

19. A connector assembly according to claim 1, wherein the slider lock has a terminal end protruding beyond the snap end of the latch when the slider lock is in the securing position, wherein the terminal end of the slider lock is received in a matching recess in the second connector.

20. A connector assembly according to claim 1 comprising retention means holding the lock in a first position before it is moved into its locking position.

21. A connector assembly according to claim 1 wherein the lock caps a cable entry side of the first connector and comprises a cable entry passage.

22. A connector assembly according to claim 1 wherein the snap section comprises a cam chamfered at both sides in a connecting direction.

23. A connector assembly according to claim 1, wherein the latch is part of the first connector.

24. A connector according to claim 1, wherein the first connector is a cable connector.

25. A connector assembly according to claim 1, wherein the second connector is an on-board pin header connector.

26. A connector configured as a first connector or as a second connector in an assembly according to claim 1.

27. A housing for a connector configured as a first, connector or as a second connector in an assembly according to claim 1.

* * * * *